(12) United States Patent
Song

(10) Patent No.: US 8,373,837 B2
(45) Date of Patent: Feb. 12, 2013

(54) LIQUID CRYSTAL DISPLAY PANEL OF LINE-ON GLASS TYPE TO PREVENT SIGNAL INTERFERENCE BETWEEN LINE-ON GLASS SIGNAL LINES AND METHOD OF FABRICATING THE SAME

(75) Inventor: In Duk Song, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 1564 days.

(21) Appl. No.: 10/669,371

(22) Filed: Sep. 25, 2003

(65) Prior Publication Data

US 2004/0108985 A1 Jun. 10, 2004

(30) Foreign Application Priority Data

Dec. 10, 2002 (KR) .................... 10-2002-0078376

(51) Int. Cl.
*G02F 1/1333* (2006.01)
*G02F 1/1345* (2006.01)

(52) U.S. Cl. ......... 349/152; 349/138; 349/149; 349/151

(58) Field of Classification Search .................. 349/143, 349/138, 149–152
See application file for complete search history.

(56) References Cited

U.S. PATENT DOCUMENTS

| 5,311,342 | A  | * | 5/1994 | Watanabe | 349/152 |
|-----------|----|---|--------|----------|---------|
| 6,052,171 | A  | * | 4/2000 | Kawaguchi | 349/149 |
| 2001/0026345 | A1 | * | 10/2001 | Park et al. | 349/149 |
| 2002/0008794 | A1 | * | 1/2002 | Song et al. | 349/40 |
| 2002/0044246 | A1 | * | 4/2002 | Moon et al. | 349/141 |
| 2002/0180686 | A1 | * | 12/2002 | Yuda et al. | 345/103 |
| 2003/0117564 | A1 | * | 6/2003 | Park et al. | 349/149 |
| 2004/0095303 | A1 | * | 5/2004 | Moon et al. | 345/87 |

FOREIGN PATENT DOCUMENTS

| KR | 10-1999-0024956 | * | 4/1999 |
| KR | 1999-024956 |   | 4/1999 |

* cited by examiner

*Primary Examiner* — Lauren Nguyen
(74) *Attorney, Agent, or Firm* — Birch, Stewart, Kolasch & Birch, LLP

(57) ABSTRACT

A line-on glass type liquid crystal display panel that is adapted to prevent signal interference and electromagnetic interference between line-on glass type signal lines. The liquid crystal display panel of the invention includes a picture display part with a matrix of liquid crystal cells, multiple line-on glass type signal lines located in an outer area of the picture display part for applying drive signals to drive the liquid crystal cells, and a dummy line formed between the line-on glass type signal lines with at least a layer of insulating film therebetween.

20 Claims, 5 Drawing Sheets

LIQUID CRYSTAL DISPLAY PANEL OF LINE-ON GLASS TYPE TO PREVENT SIGNAL INTERFERENCE BETWEEN LINE-ON GLASS SIGNAL LINES AND METHOD OF FABRICATING THE SAME

BACKGROUND OF THE INVENTION

1. Field of the Invention

The invention pertains to a line-on glass type liquid crystal display panel that has been adapted to prevent signal interference between line-on glass signal lines.

2. Description of the Related Art

A liquid crystal display uses an electric field to control the light transmittance of a liquid crystalline material to display a picture. To this end, the liquid crystal display includes a liquid crystal display panel where liquid crystal cells are arranged in a matrix. A driver circuit drives the liquid crystal display panel.

Gate lines and data lines are arranged in the liquid crystal display panel with the gate lines crossing the data lines. The liquid crystal cells are located at the areas where the gate lines cross the data lines. The liquid crystal display panel has a common electrode and pixel electrodes that are used to apply an electric field to each liquid crystal cell. Each pixel electrode is connected to any one of the data lines through the source and drain terminals of thin film transistors used as switching devices. The thin film transistors can be field effect transistors. The gate terminal of the thin film transistor is connected to any one of the gate lines to allow pixel voltage signals to be applied to the pixel electrode by-lines.

The driver circuit includes a gate driver for driving gate lines, a data driver for driving data lines, a timing controller controlling the gate driver and the data driver, and a power supply applying various drive voltages used in the liquid crystal display. The timing controller controls the drive timing of the gate driver and the data driver, and applies pixel data signals to the data driver. The power supply generates drive voltages such as a common voltage Vcom, a gate high voltage Vgh and a gate low voltage Vgl needed to input power to the liquid crystal display. The gate driver sequentially applies scan signals to the gate lines to sequentially drive the liquid crystal cells on the liquid crystal display panel by-lines. The data driver applies the pixel voltage signal to each data line whenever the scan signal is applied to any one of the gate lines. Accordingly, the liquid crystal display controls the light transmittance by the electric field applied between the pixel electrode and the common electrode in accordance with the pixel voltage signal, thereby displaying a picture.

The data driver and the gate driver are directly connected to the liquid crystal display panel and are integrated into multiple of integrated circuits (IC). The integrated data drive IC and gate drive IC are each mounted on a tape carrier package (TCP) to connect to the liquid crystal display by a tape automated bonding (TAB) method or to mount on the liquid crystal display panel by a chip on glass (COG) method.

The drive IC's connected to the liquid crystal display panel by the TAB method through the TCP receive control signals and DC voltages inputted from the outside through the control lines of a printed circuit board (PCB) connected to the TCP, which are also connected reciprocally. More particularly, the data drive IC's are connected in series through the signal lines mounted on the data PCB and commonly receive the control signal and pixel data signal from the timing controller and the drive voltages from the power supply. The gate drive IC's are connected in series through the signal lines mounted on the gate PCB and commonly receive the control signals from the timing controller and the drive voltages from the power supply.

The drive IC's mounted on the liquid crystal display panel by a COG method are connected reciprocally by a line-on glass (LOG) method where the signal lines are mounted on the liquid crystal display panel, i.e., a lower glass, and receive the control signals and the drive voltages from the timing controller and the power supply.

Recently, liquid crystal displays have been thinned by removing the PCB in the LOG method, even when the drive IC's are connected to the liquid crystal display panel by the TAB method. Specifically, the signal lines connected to the gate drive IC, which need relatively fewer signal lines, are formed on the liquid crystal display panel by the LOG method, thereby removing the gate PCB. That is, the gate drive IC's of the TAB method are connected in series through the signal lines mounted on the lower glass of the liquid crystal display panel and commonly receive the control signals and the drive voltage signals (hereinafter, gate drive signals).

FIG. 1 shows an exemplary liquid crystal display where the gate PCB is removed in use of LOG type signal lines. The liquid crystal display includes a liquid crystal display panel 1, a multiple data TCP's 8 connected between the liquid crystal display panel 1 and a data PCB 12, a plurality of gate TCP's 14 connected to the other side of the liquid crystal display panel 1, data driver IC's 10 mounted on the data TCP's respectively, and gate driver IC's 16 mounted on the gate TCP's respectively.

The liquid crystal display panel 1 includes a lower substrate 2 provided with a thin film transistor array together with various signal lines, an upper substrate 4 provided with a color filter array, and liquid crystal injected between the lower substrate 2 and the upper substrate 4. In such a liquid crystal display panel 1, there is provided a picture display area 21 that contains liquid crystal cells provided at each intersection of gate lines 20 and data lines 18, and a picture is displayed in the picture display area 21. Data pads extended from the data line 18 and the gate pads extended from the gate line 20 are located in the outer part of the picture display area 21. Further, an LOG type signal line group 26 for transmitting the gate drive signal applied to the gate drive IC 16 is located at the outer area of the lower substrate 2.

The data drive IC 10 is mounted on the data TCP 8, and input pads 24 and output pads electrically connected to the data drive IC 10 are formed on the data TCP 8. The input pads of the data TCP 8 are electrically connected to the output pads of the data PCB 12, and the output pads 25 are electrically connected to the data pads on the lower substrate 2. Specifically, in the first data TCP 8, there is additionally formed a gate drive signal transmission group 22 electrically connected to the LOG type signal line group 26 on the lower substrate 2. The gate drive signal transmission group 22 applies the gate drive signals supplied from the timing controller and the power supply to the LOG type signal line group 26 through the data PCB 12.

The data drive IC's 10 convert the digital pixel data signal into analog pixel voltage signal, and applies the pixel voltage signal to the data lines 18 on the liquid crystal display panel.

The gate dive IC 16 is mounted on the gate TCP 14. The gate control signals and power signals applied to the gate TCP 14 are inputted into the gate dive IC 16 through the input terminal of the gate drive IC 16. And, the gate control signals and the power signals are outputted through the output terminal 30 of the gate drive IC 16 and applied to the gate drive IC 16 mounted on the next gate TCP 14 through the gate TCP 14 and the LOG signal line group 26.

The gate drive IC's 16 sequentially apply scan signals, i.e., gate high voltage signal VGH, in response to the input control signals. Further, the gate drive IC's 16 apply the gate low voltage signal VGL to the gate lines in a remaining period except for the period when the gate high voltage signal VGH is applied.

The LOG type signal line group 26 consists of signal lines each applying DC voltage signals applied from the power supply, i.e., a gate high voltage signal VGH, a gate low voltage signal VGL, a common voltage signal VCOM, a ground voltage signal GND and a power voltage signal, and gate control signals applied from the timing controller, i.e., a gate start pulse GSP, a gate shift clock signal GSC and a gate enable signal GOE. Further, the LOG type signal line group 26 includes a LOG type data pad group 32 connected to the data TCP 8 together with the data pads to which the data signal is applied, and a LOG type gate pad group 34 connected to the gate TCP 14 together with the gate pads to which the gate signal is applied.

The LOG type signal lines 26 of the LOG type liquid crystal display panel are formed of gate metal on the lower substrate 2, as shown in FIG. 3. In other words, the LOG type signal lines 26 are simultaneously formed of the same metal as the gate lines 20. For example, the LOG type signal lines 26 uses the gate metal such as AlNd.

The LOG type signal lines 26 of the related art liquid crystal display are formed adjacent to each other in a limited edge area on the lower substrate 2. Accordingly, the LOG type signal lines 26 have high impedance because the LOG type signal lines 26 include a relatively high line resistance and parasitic capacitance. This results in signal interference and electromagnetic interference (EMI) between the LOG type signal lines 26. Because of this, the gate signals applied to the gate drive IC 16 through the LOG type signal lines 26 are distorted.

SUMMARY OF THE INVENTION

An object of the present invention, in part, provides a line-on glass type liquid crystal display panel that is adapted to preventing signal interference and electromagnetic interference between line-on glass type signal lines and a fabricating method thereof.

An embodiment of the invention, in part, includes a picture display part with a matrix of liquid crystal cells, multiple line-on glass type signal lines located in an outer area of the picture display part for applying drive signals to drive the liquid crystal cells, and a dummy line formed between the line-on glass type signal lines with at least a layer of insulating film therebetween.

The line-on glass type liquid crystal display panel can further include a first and a second line-on glass signal pad that extends from both sides of the line-on glass type signal line.

The line-on glass type liquid crystal display panel can further include a first and a second dummy pad that extend from both sides of the dummy line. The first and second dummy pads can be located between the first and second line-on glass type signal pads. Also, the line-on glass type signal lines can be formed in the same layer as a gate line of the picture display part. Additionally, the dummy line can be formed in the same layer as a data line of the picture display part that crosses the gate line with a gate insulating film therebetween.

In the invention, the dummy line can be located between the line-on glass type signal lines with the gate insulating film therebetween. Also, the dummy line can be formed in the same layer as a pixel electrode of the picture display part.

In the invention, the dummy line can be located between the line-on glass type signal lines with a gate insulating film and a protective film therebetween, and the gate insulating film and the protective film are formed to cover the gate line. The dummy line can transmit a common voltage, or the dummy line can transmit a ground voltage.

The invention, in part, pertains to a fabrication method of a line-on glass type liquid crystal display panel that includes forming multiple line-on glass type signal lines in the outer area of a picture display part, forming at least a layer of insulating film to cover the line-on glass type signal lines, and forming a dummy line that is located between the line-on glass type signal lines on the insulating film.

The fabrication method further includes forming a gate line of the picture display part on a substrate and a gate electrode connected to the gate line, forming a gate insulating film on the substrate on which the gate line and the gate electrode are formed, forming a semiconductor layer on the gate insulating film, forming a data line crossing the gate line, a source electrode connected to the data line, and a drain electrode opposite to the source electrode with a designated gap therebetween, on the substrate on which the semiconductor is formed, forming a protective film on the substrate where the data line, the source electrode and the drain electrode are formed, and forming a pixel electrode connected to the drain electrode on the protective film.

In the method, the line-on glass type signal line can be formed of the same metal as the gate line. The dummy line can be formed of the same metal as the data line.

In the method, the dummy line can be formed between the line-on glass type signal lines with the gate insulating film therebetween. The dummy line can be formed of the same metal as the pixel electrode.

In the method, the dummy line can be formed between the line-on glass type signal lines with the gate insulating film and the protective film therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION

Advantages of the invention will become more apparent from the detailed description given hereinafter. However, it should be understood that the detailed description and specific examples, while indicating preferred embodiments of the invention, are given byway of illustration only, since various changes and modifications within the spirit and scope of the invention will become apparent to those skilled in the art from this detailed description.

Figure 1:
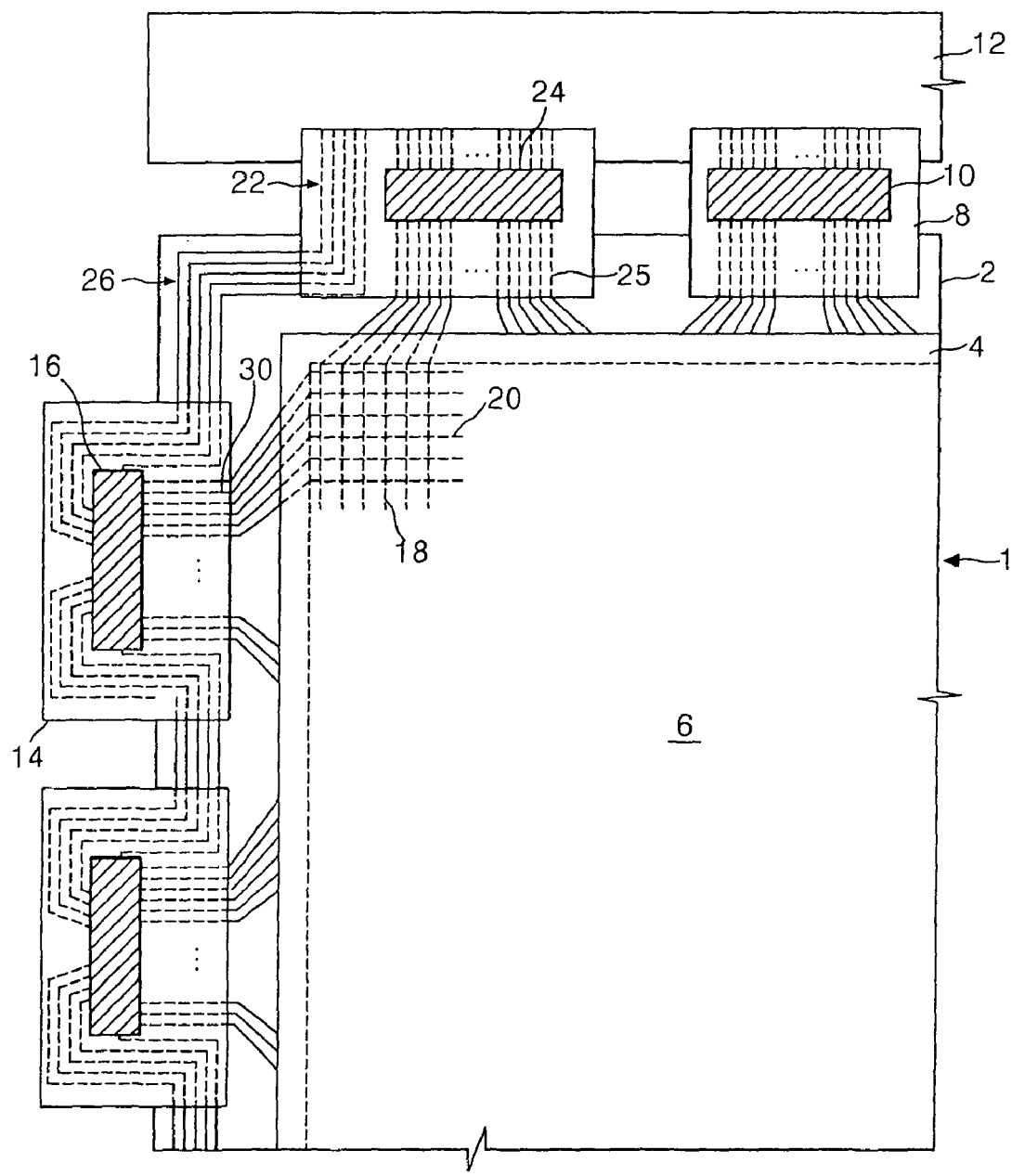
FIG. 1 is a plan view briefly illustrating a configuration of a line-on glass type liquid crystal display of the related art.
Figure 2:
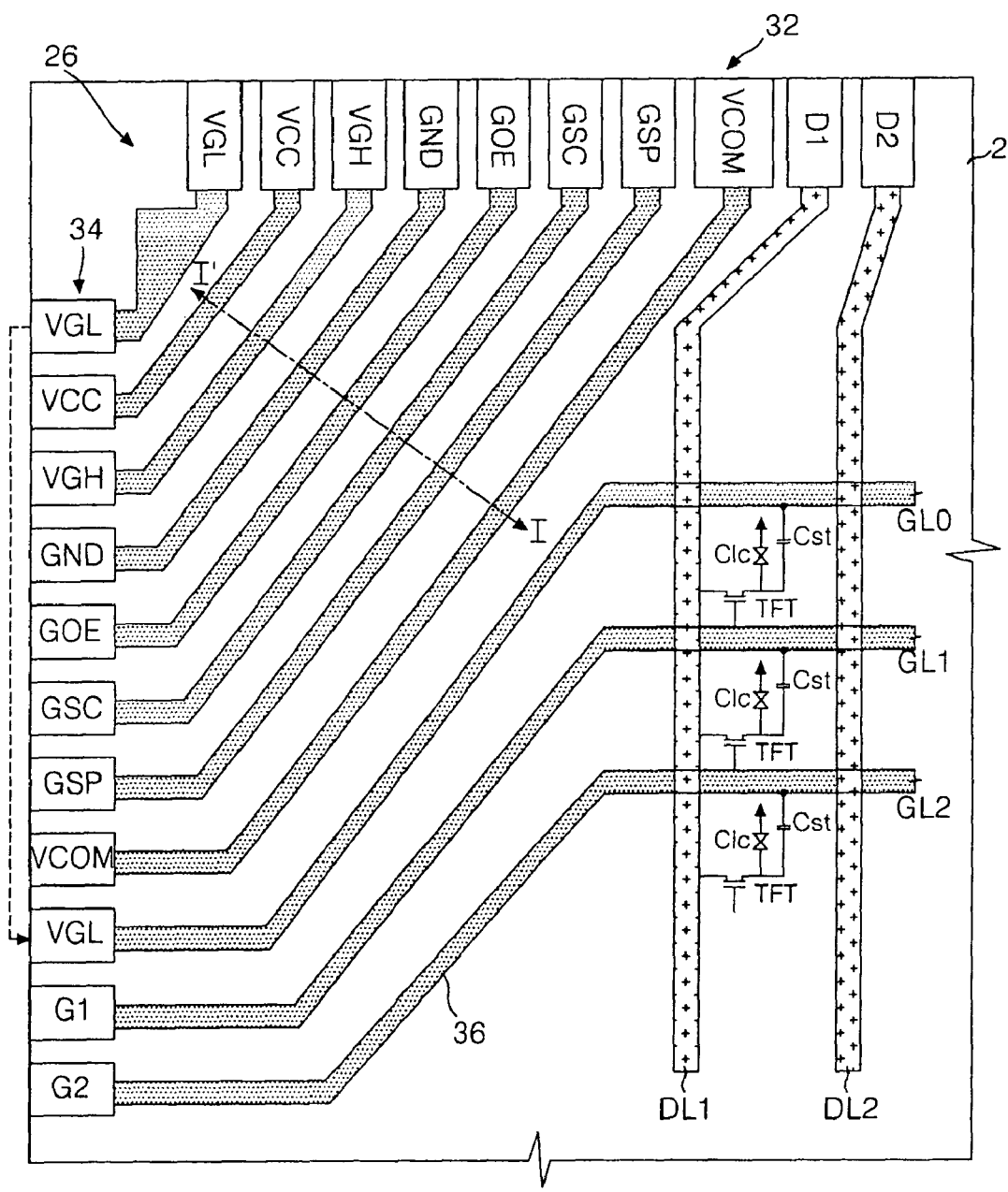
FIG. 2 is an enlarged plan view representing a signal line group of the related art line-on glass type liquid crystal display panel shown in FIG. 1.
Figure 3:
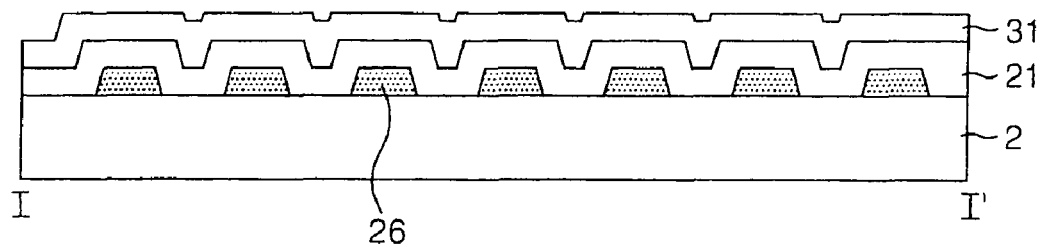
FIG. 3 is a sectional view illustrating a related art line-on glass type signal line taken along the line I-I' shown in FIG. 2.
Figure 4:
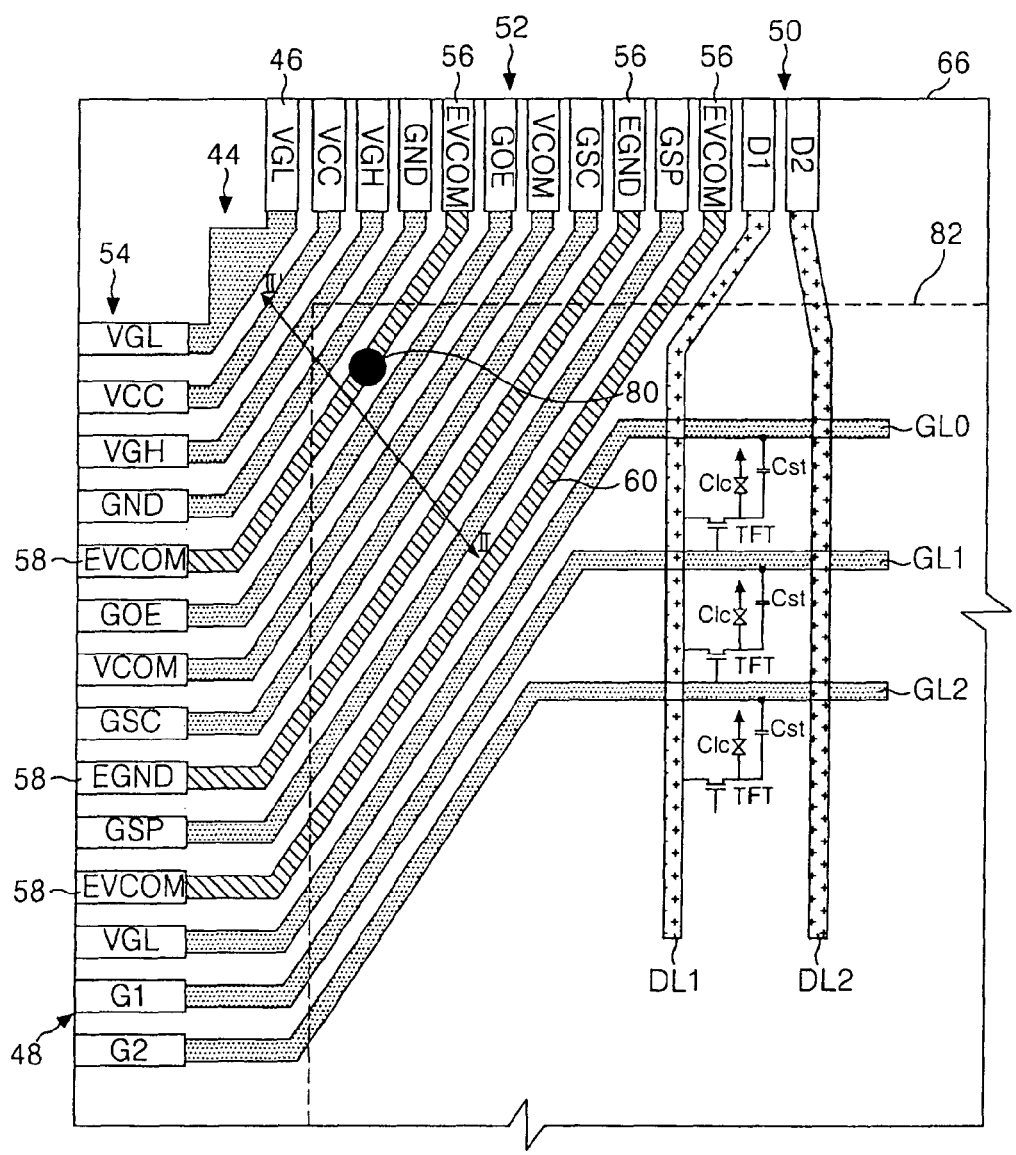
FIG. 4 is an enlarged plan view representing a signal line group of a line-on glass type liquid crystal display panel according to an embodiment of the invention.

FIG. 4 shows an enlarged plan view illustrating an LOG type signal line group in an LOG type liquid crystal display panel according to an embodiment of the invention.

Referring to FIG. 4, the LOG type liquid crystal display panel according to the invention includes a lower substrate 66 where a thin film transistor array is formed together with various signal lines, an upper substrate 82 provided with a color filter array, and liquid crystal injected between the lower substrate 66 and the upper substrate 82. The liquid crystal can have either positive or negative dielectric anisotropy.

In such a liquid crystal display panel, there is a picture display area having liquid crystal cells at each intersection of gate lines GL and data lines DL, and a picture is displayed on the picture display area.

Data pads 50 extended from the data line DL and gate pads 48 extended from the gate line GL are located in the outer part of the picture display area. The data pads 50 are connected to a data TCP (not shown) on which there is mounted a data drive IC (not shown) generating a data drive signal for use with a data control signal and a voltage signal from a timing controller (not shown) and a power supply (not shown). The gate pads 48 are connected to a gate TCP (not shown) on which there is mounted a gate drive IC (not shown) generating a gate drive signal in use of a gate control signal and a voltage signal from the timing controller and the power supply. The gate control signal and the voltage signal are applied to the gate drive IC that is mounted on the gate TCP through a first data TCP (not shown) and an LOG type signal line group 44.

The LOG type signal line group 44 is located in the outer part of the lower substrate 66 and applies the gate control signal and the voltage signal to the gate drive IC. The LOG type signal line group 44 has signal lines each applying DC voltage signals applied from the power supply, i.e., a gate high voltage signal VGH, a gate low voltage signal VGL, a common voltage signal VCOM, a ground voltage signal GND and a power voltage signal. Gate control signals are applied from the timing controller, i.e., a gate start pulse GSP, a gate shift clock signal GSC and a gate enable signal GOE.

The LOG type signal line group 44 connects between a first LOG type pad group 52 together with the data pads 50 connected to the first data TCP, and a second LOG type pad group 54 together with the gate pads 48 connects to the gate TCP. In other words, the LOG type signal line group 44 receives the gate control signal and the power signal from the first LOG type pad group 52, and applies the received signal to the second LOG type pad group 54 electrically connected to the input terminal of the gate drive IC.

A first dummy pad group 56 is located among the first LOG pad group 52, and a second dummy pad group 58 is located among the second LOG pad group 54. The first dummy pad group 56 and the second dummy pad group 58 electrically connect to a dummy line 60. In other words, the dummy line 60 receives a designated signal from the first dummy pad group 56 and applies the received signal to the second dummy pad group 58.

Figure 5:
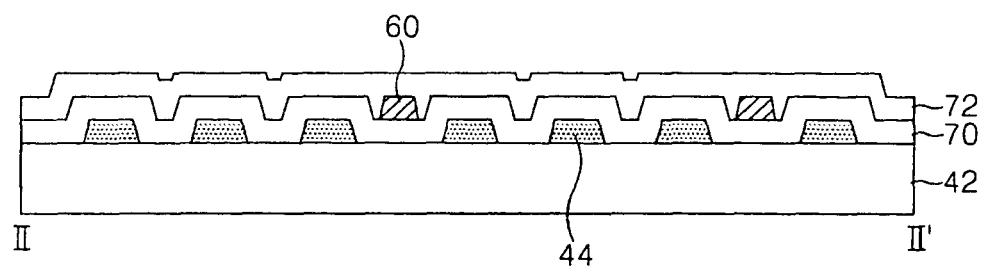
FIG. 5 is a sectional view representing an inventive line-on glass type signal line and a dummy line taken along the line II-II' shown in FIG. 4.
Figure 6:
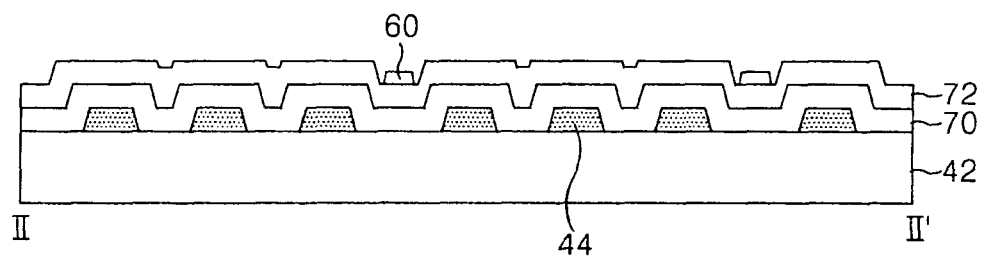
FIG. 6 is a sectional view representing another type of inventive line-on glass type signal line and a dummy line taken along the line II-II' shown in FIG. 4.

The dummy line 60 is formed between the LOG type signal lines 44 as a common voltage signal EVCOM line that applies a common voltage VCOM of a reference voltage when driving a liquid crystal cell Clc, or a ground voltage signal EGND line that applies a ground voltage GND. Such a dummy line 60, as shown in FIGS. 5 and 6, is formed with at least one insulating film therebetween in a different layer from the LOG type signal line 44. In other words, the dummy line 60, as shown in FIG. 5, is formed of a data metal layer between the LOG signal lines 44 with a gate insulating film therebetween. Alternatively, the dummy line 60 is formed of a transparent metal layer between the LOG type signal lines 44 with the gate insulating film 70 and a protective film 72 therebetween, as shown in FIG. 6.

On the other hand, any one of the common voltage signal VCOM lines applying the common voltage among the LOG type signal line group 44 and the common voltage signal EVCOM line applying the common voltage among the dummy lines 60 applies the common voltage signal through a silver (Ag) dot 80 to a common electrode that is deposited on the entire surface of the upper substrate 82. The common electrode can be formed from silver, indium-tin-oxide, indium-zinc-oxide or any other suitable material.

In this way, the dummy lines 60 are formed between the LOG type signal lines 44 with at least a layer of insulating film therebetween. Accordingly, a capacitor C forms between the dummy line 60 and the LOG type signal line 44. The capacitor C causes an EMI signal, which is a high frequency component from the LOG type signal line 44, to bypassed to thereby reduce the EMI remarkably. Thus, signal interference can be prevented.

FIG. 5 is a diagram representing an LOG type signal line group and dummy lines according to the invention, and a fabricating process of the LOG type signal line group, the dummy lines and a thin film transistor array on a lower substrate.

Gate metal is deposited on the lower substrate 42 and then patterned to form the LOG type signal line group 44 along with a gate pattern that includes the gate electrode of a thin film transistor, gate lines and gate pads. Then, a first insulating material is entirely deposited to cover them, so as to form the gate insulating film 70. After depositing a first and a second semiconductor layer on the gate insulating film 70, the semiconductor layers are patterned to form an active layer and an ohmic contact layer of the thin film transistor. Subsequently, after a data metal layer is deposited on the lower substrate 42, the data metal layer is patterned to form dummy lines 60 together with the source and drain electrode of the thin film transistor, the data lines and the data pads. Then, a second insulating material is deposited to cover the whole surface of them and patterned to form a protective film 72 that has a contact hole. Lastly, a transparent conductive material is deposited on the protective film 72 and patterned to form a pixel electrode. This transparent conductive material can typically be indium-tin-oxide or indcium-zinc-oxide.

FIG. 6 is a diagram representing another form of an LOG type signal line group and dummy lines according to the invention, and a fabricating process of the LOG type signal line group. The formation of dummy lines and a thin film transistor array on a lower substrate is explained below in reference to FIG. 6.

A gate metal layer is deposited on the lower substrate 42 and then patterned to form the LOG type signal lines 44 along with a gate pattern including the gate electrode of a thin film transistor, gate lines and gate pads. Then, a first insulating material is entirely deposited to cover the underlying structure, so as to form the gate insulating film 70. After depositing a first and a second semiconductor layer on the gate insulating film 70, the semiconductor layers are patterned to form an active layer and an ohmic contact layer of the thin film transistor. Subsequently, after a data metal layer is deposited on the lower substrate 42, the data metal layer is patterned to form the source and drain electrode of the thin film transistor, the data lines and the data pads. Then, a second insulating material is deposited to cover the whole surface of them and patterned to form a protective film 72 that has a contract hole. Lastly, a transparent conductive material is deposited on the protective film 72 and patterned to form a dummy line 60 together with a pixel electrode.

As described above, in the LOG type liquid crystal display panel according to the invention, a dummy line forms between the LOG type signal lines, wherein the dummy line transmits the common voltage and the ground voltage signal. The dummy line prevents signal interference, eliminates parasitic capacitance, and prevents EMI phenomenon from occurring between the LOG type signal lines. Accordingly, the invention prevents deterioration of the drive signal that is applied to the gate drive IC through the LOG type signal line.

Although the invention has been explained by the embodiments shown in the drawings and described above, it should be understood by persons having ordinary skill in the art that the invention is not limited to the illustrated embodiments, but rather that various changes or modifications thereof are possible without departing from the spirit of the invention. Accordingly, the scope of the invention shall be determined only by the appended claims and their equivalents.

What is claimed is:

1. A line-on glass liquid crystal display panel having sides and corners defined at intersections of the sides, comprising:
    a picture display part having liquid crystal cells at each intersection of first ~(n)th gate lines and first ~(m)th data lines;
    first~(m)th data pads extended from the first ~(m)th data lines in an outer area of the picture display part;
    first~(n)th gate pads extended from the first ~(n)th gate lines in the outer area of the picture display part;
    a plurality of first line-on glass signal pads formed just beside the first data pad and a plurality of second line-on glass signal pads formed just beside the first gate pad, the first and second line-on glass signals pads are on respective intersecting sides which define one corner of the outer area of the picture display part;
    a plurality of line-on glass type signal lines connecting the first and second line-on glass signal pads in the corner of the outer area of the picture display part for applying gate power voltage signals and gate control signals to gate drive ICs in order to drive gate signal lines of the picture display part;
    a plurality of first dummy pads between the first line-on glass type signal pads and a plurality of second dummy pads between the second line-on glass type signal pads; and
    a plurality of dummy lines connecting the first and second dummy pads in the one corner of the outer area of the picture display part, wherein the plurality of first and second dummy lines are formed between the line-on glass type signal lines for applying a common voltage as a reference voltage to drive the liquid crystal cells with at least one layer of insulating film therebetween, wherein the insulating film covers the plurality of line-on glass type signal lines and the dummy lines are formed on the layer of insulating film.

2. The line-on glass liquid crystal display panel according to claim 1, wherein the line-on glass type signal lines are formed in a same layer as the gate line of the picture display part.

3. The line-on glass liquid crystal display panel according to claim 2, wherein the dummy line is formed in a same layer as the data line of the picture display part with a gate insulating film therebetween.

4. The line-on glass liquid crystal display panel according to claim 3, wherein the dummy line is located between the line-on glass type signal lines with the gate insulating film therebetween.

5. The line-on glass liquid crystal display panel according to claim 2, wherein the dummy line is formed in a same layer as a pixel electrode of the picture display part.

6. The line-on glass liquid crystal display panel according to claim 5, wherein the dummy line is located between the line-on glass type signal lines with a gate insulating film and a protective film therebetween, and the gate insulating film and the protective film are formed to cover the gate line.

7. A fabricating method of a line-on glass liquid crystal display panel having sides and corners defined at intersections of the sides, comprising:
    forming first~(n)th gate lines in a picture display part and a plurality of line-on glass signal lines in one corner of an outer area of the picture display part on a substrate for applying gate power voltage signals and gate control signals to gate drive ICs in order to drive gate signal lines of the picture display part;
    forming at least one layer of insulating film to cover the line-on glass type signal lines;
    forming first~(m)th data lines to cross the first~(n)th gate lines in a picture display part and a dummy line that is located between the line-on glass signal lines on the insulating film for applying a common voltage as a reference voltage; and
    forming first~(m)th data pads extended from the first~(m)th data lines on one side and first~(n)th gate pads extended from the first~(n)th gate lines on an intersecting side of the outer of the picture display part and forming first and second line-on glass signal pads just beside the first data pad and first gate pad, respectively and first dummy pads between the first line-on glass signal pads and second dummy pads between the second line-on glass pads, respectively, the intersecting sides defining one corner of the outer area of the picture display part,
    wherein each of the plurality of the line-on glass signal lines is connected between the first and the second line-on glass signal pads in the one corner of the outer area of the picture display part.

8. The fabricating method according to claim 7, further comprising:
    forming a gate electrode connected to the gate line of the picture display part on the substrate;
    forming a gate insulating film on the substrate on which the gate line and the gate electrode are formed;
    forming a semiconductor layer on the gate insulating film;
    forming a source electrode connected to the data line, and a drain electrode opposite to the source electrode with a designated gap therebetween, on the substrate on which the semiconductor is formed;

forming a protective film on the substrate where the data line, the source electrode and the drain electrode are formed; and forming a pixel electrode connected to the drain electrode on the protective film.

9. The fabricating method according to claim 7, wherein the line-on glass signal lines are formed of a same metal as the gate line.

10. The fabricating method according to claim 9, wherein the dummy line is formed of a same metal as the data line.

11. The fabricating method according to claim 10, wherein the dummy line is formed between the line-on glass type signal lines with the gate insulating film therebetween.

12. The fabricating method according to claim 9, wherein the dummy line is formed of a same metal as the pixel electrode.

13. The fabricating method according to claim 12, wherein the dummy line is formed between the line-on glass type signal lines with the gate insulating film and the protective film therebetween.

14. A line-on glass liquid crystal display panel having sides and corners defined at intersections of the sides, comprising:
a picture display part with a matrix of liquid crystal cells having a plurality of gate lines and data lines to cross each other;
a gate pad and a data pad to drive the gate lines and data lines, respectively, the gate pad and the data pad are formed in an outer area of the picture display part of a low substrate;
a plurality of line-on glass type signal lines located in one corner of the outer area of the picture display part of the lower substrate for applying drive signals to drive the liquid crystal cells, wherein the one corner of the outer area of the picture display part is defined by the intersection of two sides of said outer area of the lower substrate and wherein the gate pad is adjacent to one of the sides and the data pad is adjacent to the intersecting side;
a gate insulating layer covering the line-on glass type signal lines; and
a plurality of common voltage signal lines for applying a common voltage signal and being formed between line-on glass type signal lines, on the gate insulating layer, wherein at least one of the plurality of common voltage lines applies the common voltage signal through a silver (Ag) dot to a common electrode that is formed on an entire surface of an upper substrate.

15. The line-on glass liquid crystal display panel according to claim 14, wherein the gate signal lines are Vgl, Vcc, Vgh, GOE, GSC, GSP.

16. A line-on glass liquid crystal display panel having sides and corners defined at intersections of the sides, comprising:
a picture display part with a matrix of liquid crystal cells having a plurality of gate lines and data lines to cross each other;
a gate pad and a data pad to drive the gate lines and data lines, respectively, the gate pad and the data pad are formed in an outer area of the picture display part of a low substrate on respective intersecting sides which define one corner;
a plurality of line-on glass type signal lines located in one corner of the outer area of the picture display part of the lower substrate extending from one side to the other intersecting side that defines the one corner for applying drive gate signals to drive the liquid crystal cells, wherein the plurality of line-on-glass signal lines are located between the gate pad and the data pad;
a common voltage line located in the one corner and extending from the one side to the other intersecting side that defines the one corner, wherein the common voltage line is adjacent to both the gate pad and the data pad; and
a plurality of dummy lines and an insulating film covering the plurality of line-on glass type signal lines, wherein the dummy lines are formed on the layer of insulating film, and wherein a capacitor is formed between a dummy line and a signal type line for causing an EMI signal to reduce EMI signal interference.

17. The line-on glass liquid crystal display panel according to claim 16, wherein the gate signal lines are Vgl, Vcc, Vgh, GOE, GSC, GSP.

18. The line-on glass liquid crystal display panel according to claim 16, wherein the common voltage line applies the common voltage signal through a silver (Ag) dot to a common electrode that is formed on an entire surface of an upper substrate.

19. The line-on glass liquid crystal display panel according to claim 1, wherein a capacitor is formed between a dummy line and a signal type line for causing an EMI signal to reduce EMI signal interference.

20. The line-on glass liquid crystal display panel according to claim 14, further including a plurality of dummy lines and an insulating film covering the plurality of line-on glass type signal lines, wherein the dummy lines are formed on the layer of insulating film, and wherein a capacitor is formed between a dummy line and a signal type line for causing an EMI signal to reduce EMI signal interference.

* * * * *